US011095454B2

(12) United States Patent
Goldman et al.

(10) Patent No.: US 11,095,454 B2
(45) Date of Patent: Aug. 17, 2021

(54) RELEASING SECRET INFORMATION IN A COMPUTER SYSTEM

(71) Applicant: International Business Machines Corporation, Armonk, NY (US)

(72) Inventors: Kenneth A. Goldman, Norwalk, CT (US); Dimitrios Pendarakis, Westport, CT (US)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 16/139,479

(22) Filed: Sep. 24, 2018

(65) Prior Publication Data

US 2020/0099532 A1    Mar. 26, 2020

(51) Int. Cl.
*H04L 29/06* (2006.01)
*H04L 9/32* (2006.01)
*G06F 9/455* (2018.01)
*G06F 21/55* (2013.01)

(52) U.S. Cl.
CPC ........ *H04L 9/3247* (2013.01); *G06F 9/45533* (2013.01); *G06F 21/552* (2013.01); *H04L 63/08* (2013.01)

(58) Field of Classification Search
None
See application file for complete search history.

(56) References Cited

U.S. PATENT DOCUMENTS

| 7,568,114 B1* | 7/2009 | Schlafly | G06Q 20/382 705/64 |
| 2004/0073806 A1 | 4/2004 | Zimmer | |
| 2008/0182592 A1 | 7/2008 | Cha et al. | |
| 2009/0204964 A1* | 8/2009 | Foley | G06F 9/45558 718/1 |
| 2012/0265976 A1* | 10/2012 | Spiers | G06F 9/45533 713/2 |
| 2015/0082399 A1* | 3/2015 | Wu | H04L 9/0897 726/6 |
| 2015/0350177 A1* | 12/2015 | Sharp | G06Q 20/3227 726/6 |
| 2017/0041793 A1* | 2/2017 | Lee | G06F 21/629 |

FOREIGN PATENT DOCUMENTS

EP    1181632 B1    12/2010

OTHER PUBLICATIONS

Sau, Suman et al. Survey of secure processors. 2017 International Conference on Embedded Computer Systems: Architectures, Modeling, and Simulation (SAMOS). https://ieeexplore.ieee.org/stamp/stamp.jsp?tp=&arnumber=8344637 (Year: 2017).*

Saggese, G. P. et al. Hardware support for high performance, intrusion—and fault-tolerant systems. Proceedings of the 23rd IEEE International Symposium on Reliable Distributed Systems, 2004. https://ieeexplore.ieee.org/stamp/stamp.jsp?tp=&arnumber=1353020 (Year: 2004).*

* cited by examiner

*Primary Examiner* — Jeremiah L Avery
(74) *Attorney, Agent, or Firm* — Yee & Associates, P.C.

(57) ABSTRACT

A method, apparatus, computer system, and computer program product for releasing secret information. A client on a computer system performing an attestation to a server on another computer system. The client receives an authorization that authorizes releasing the secret information. The client releases the secret information from a co-processor on the computer system using the authorization received from the server.

23 Claims, 5 Drawing Sheets

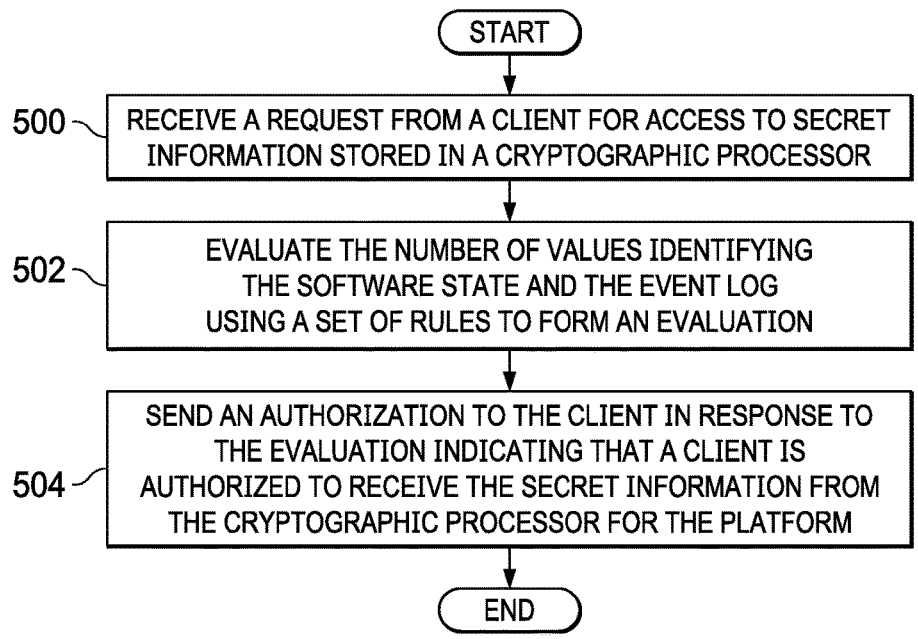
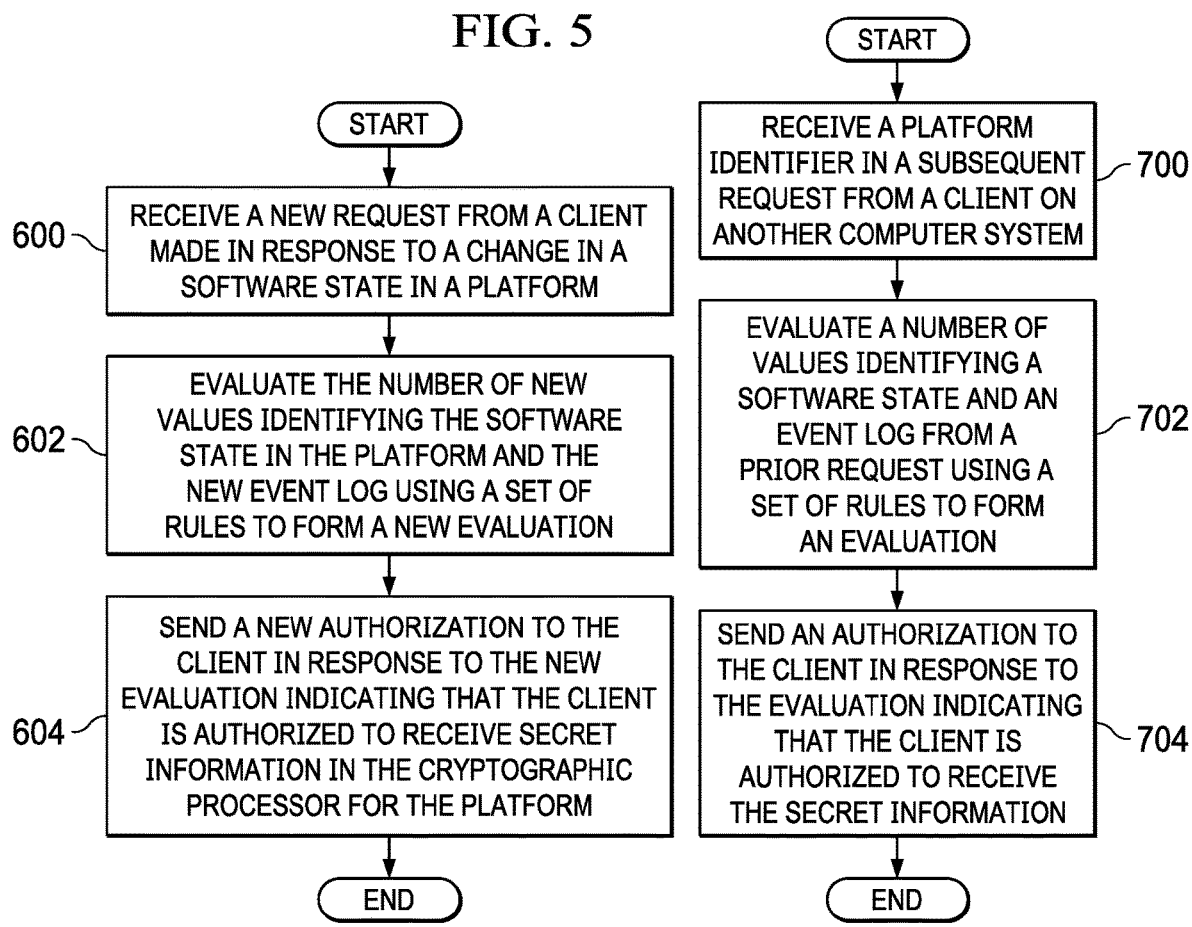

RELEASING SECRET INFORMATION IN A COMPUTER SYSTEM

BACKGROUND

1. Field

The disclosure relates generally to an improved computer system and more specifically to a method, apparatus, computer system, and computer program product for releasing secret information in a computer system having a trusted platform module (TPM).

2. Description of the Related Art

A trusted platform module (TPM) is a specialized piece of hardware, such as a chip or microcontroller, that stores secret information for a platform. The secret information can be, for example, at least one of a key, a symmetric encryption key, a decryption key, a signing key, a transport layer security (TLS) key, or some other type of secret information. The secret information is released only when the software running on the platform is in a trusted state.

The trusted platform module can also store measurements about the platform, used to determine whether the platform is trustworthy. The measurements can be one or more values stored in platform configuration registers (PCRs) in the trusted platform module. These measurements can be used to assure that a selected configuration of software that is reported to be on the platform is actually present. The platform configuration register values represent a software state of the platform.

The secret information can be sealed (encrypted) within the trusted platform module. Information is sealed when the information is encrypted. For example, the secret information can be sealed with a key. If a client requesting access to the secret information has authority, the secret information can be unsealed (unencrypted) using the key. The signed authorization can be centrally created at a server and sent to clients in the network data processing system. The authorization is permission to use the key to unseal the secret information stored in the trusted platform module.

In a network data processing system, the software may include the basic input output system (BIOS), platform firmware, and other software that may be loaded prior to loading the operating system. This software is often known for the platforms in a network data processing system. This software changes infrequently. As a result, an authorization for using the key to unseal the secret information can be signed and copies of the signed authorization are distributed to the different platforms in the network data processing system. This signed authorization can be used to access secret information stored in trusted platform module. Secret information can be, for example, an encryption key that is used to encrypt storage devices such as an encrypted disk drive or an encrypted solid-state drive.

In the trusted platform module, the secret information is sealed to platform configuration registers (PCRs). The platform configuration register values represent the software state for the platform. One problem is that, as the software state changed due to an update, the secret information had to be resealed. The end user was tasked with determining whether the update was valid.

In another implementation, the secret information can be sealed to an authorization through a digital signature. The signed authorization can be centrally created, shifting the validity decision from the end user to the enterprise. Further, the trusted platform module can create an authorization ticket, so the platform does not need to obtain a new authorization signature each time an unseal is needed.

In one example, an Integrity Measurement Architecture (IMA) is used to keep an event log of post-operating system security relevant software, and uses the trusted platform module platform configuration registers to record that history. The trusted platform module signs the platform configuration register values using a key enrolled at the server. The signature is called a quote. The package of data, including the quote signature, the quote data, the platform configuration register values, and the event log is called an attestation. The server validates the attestation by checking the quote signature against the quote data, the quote data against the platform configuration register values, the platform configuration register values against the event log, and the event log against a white list of approved software. The server can thus determine the trust state of the platform using this process.

In the current pre-operating system implementations, the platform configuration registers PCRs reflect the platform software running. For example, the platform software may be a basic input output system (BIOS), a uniform extensible firmware interface (UEFI), or platform firmware. This authorization model works well because pre-operating system software rarely changes, and, because the boot is single threaded, the order is repeatable. In this situation, an enterprise can sign an authorization once and distribute the authorization throughout the enterprise for long-term use.

This process works well for software run prior to starting the operating system because pre-operating system software rarely changes and the boot is single threaded. However, after the operating system is started, complications occur. First, with multithreaded running of software, the order in which software starts can change at each boot. Second, post operating system software is updated much more often than pre-operating system software. Third, as software runs on the platform, the platform configuration register values are continuously updated. With these three issues, the platform configuration register values are different for each platform and are continually changing.

Therefore, it would be desirable to have a method and apparatus that take into account at least some of the issues discussed above, as well as other possible issues. For example, it would be desirable to have a method and apparatus that overcome a technical problem with releasing secret information accessed using an authorization signature in post operating system conditions.

SUMMARY

According to one embodiment of the present invention, a method releases secret information. An attestation is performed by a client on a computer system to a server on another computer system. An authorization is received by the client on the computer system that authorizes releasing the secret information. The secret information is released by the client on the computer system from a co-processor on the computer system using the authorization received from the server.

According to one embodiment of the present invention, a method releases secret information in a co-processor. A computer system receives a request from a client for access to the secret information stored in the co-processor. The request includes a number of values identifying a software state in a platform, wherein the number of values is digitally signed. The computer system evaluates the number of values identifying the software state using a set of rules to form an evaluation. The set of rules indicates when the software state warrants access to the secret information in the co-processor. The computer system sends an authorization to the client in response to the evaluation indicating that the platform is authorized to receive the secret information from the co-processor for the platform. The authorization enables accessing the secret information in the co-processor by the client.

According to another embodiment of the present invention, a secret information release system comprises a computer system and a server running on the computer system. The server receives a request from a client running on another computer system for access to secret information stored in a co-processor. The request includes a number of values identifying a software state on a platform, wherein the number of values is digitally signed. The server evaluates the number of values identifying the software state using a set of rules to form an evaluation. The set of rules indicates when the software state warrants access to the secret information in the co-processor. The server sends an authorization to the client in response to the evaluation indicating that the platform is authorized to receive the secret information from the co-processor for the platform. The authorization enables accessing the secret information in the co-processor by the client.

According to yet another embodiment of the present invention, a computer program product for releasing secret information in a co-processor comprises a computer-readable storage media with first program code, second program code, and third program code stored on the computer-readable storage media. The first program code is run for performing an attestation to a server on another computer system. The second program code is run for receiving an authorization that authorizes releasing the secret information. The third program code is run for releasing the secret information from a co-processor on the computer system using the authorization received from the server.

BRIEF DESCRIPTION OF THE DRAWINGS

FIG. 5 is a flowchart of a process for processing a request for secret information in a cryptographic processor accordance with an illustrative embodiment;

FIG. 6 is a flowchart of a process for processing a new request for accessing secret information in the cryptographic processor in accordance with an illustrative embodiment;

FIG. 7 is a flowchart of a process for processing a subsequent request for accessing secret information in the cryptographic processor when the software state has not changed in accordance with an illustrative embodiment.

DETAILED DESCRIPTION

Figure 1:
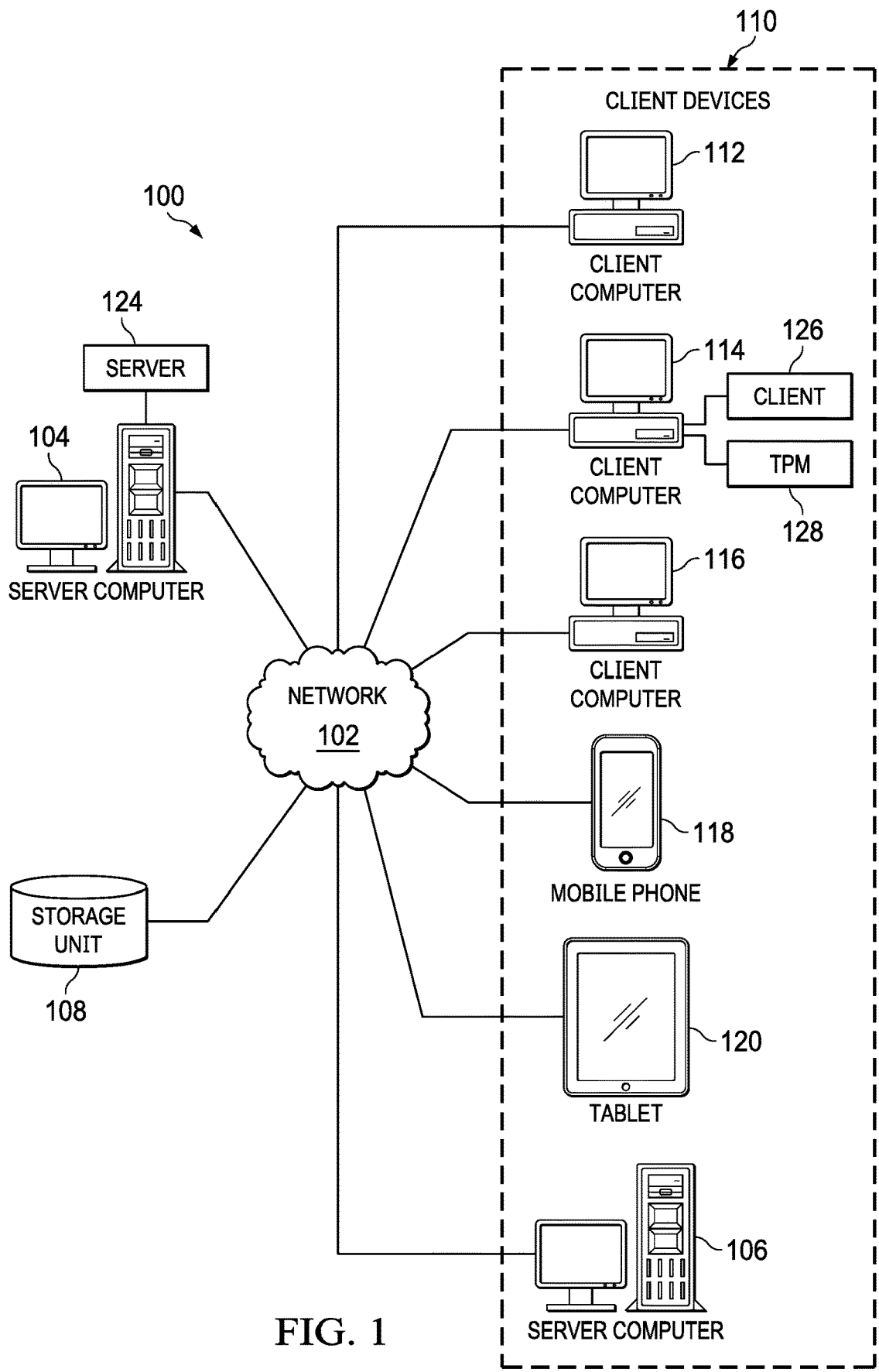
FIG. 1 is a pictorial representation of a network of data processing systems in which illustrative embodiments may be implemented.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account one or more different considerations. For example, the illustrative embodiments recognize and take into account that with software running after initialization of the operating system, complications can cause an authorization provided by server to no longer be valid. The illustrative embodiments recognize and take into account that current techniques of pre-calculating and distributing authorizations are infeasible with how long these authorizations remain valid in post operating system software.

The illustrative embodiments recognize and take into account that rather than pre-calculating authorization for devices in the network data processing system and distributing signed authorization, a server signs an authorization at runtime. The illustrative embodiments also recognize and that it may be desirable to provide a distinct authorization to each platform to reduce potential security issues, such as an unauthorized client attempting to use an authorization. In other words, the illustrative embodiments recognize and take into account that rather than pre-calculating the authorization for all platforms and distributing the authorization, the authorization can be determined on a per client basis at run time. Thus, the server signs an authorization for each client such that each client receives a distinct authorization based on the software state on the platform in which a client is located plus a unique client identifier.

Thus, the illustrative embodiments provide a method, apparatus, computer system, and computer program product for releasing secret information in a cryptographic processor. In one illustrative example, when the server, based on the event log, decides that the client is on a trusted platform, the server returns an authorization that is digitally signed with a signing key to form a signature. This signed authorization can be used by the client to access the secret information stored in the cryptographic processor for the platform. In other words, the client on platform and server interact whenever access the secret information is needed.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 connects to network 102 along with storage unit 108. In addition, client devices 110 connect to network 102. As depicted, client devices 110 include client computer 112, client computer 114, and client computer 116. Client devices 110 may be, for example, computers, workstations, or network computers. Further, client devices 110 can also include other types of client devices such as mobile phone 118, tablet computer 120, and server computer 106.

Client devices 110 are clients to server computer 104 in this example. As depicted, server computer 106 is a client device because server computer 106 will request authorization from server computer 104 to access secret information stored in trusted platform module in server computer 106. Network data processing system 100 may include additional server computers, client computers, and other devices not shown. Client devices 110 connect to network 102 utilizing at least one of wired, optical fiber, or wireless connections.

Program code located in network data processing system 100 may be stored on a computer recordable storage medium and downloaded to a data processing system or other device for use. For example, program code may be stored on a computer recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 may be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, when used with reference to items, "a number of," when used with reference items, means one or more items. For example, "a number of different types of networks" is one or more different types of networks.

Further, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combination of these items may be present. In some illustrative examples, "at least one of" may be, for example, without limitation, two of item A; one of item B; and ten of item C; four of item B and seven of item C; or other suitable combinations.

In this illustrative example, server computer 104, server computer 106, and client devices 110 may all include cryptographic processors in the form of trusted platform modules that are used to protect secret information. For example, server 124 can run on server computer 104 in which server 124 operates to process requests to release secret information from clients that may run on at least one of client devices 110.

For example, client 126, running on client computer 114, may need to access secret information stored in trusted platform module (TPM) 128. The secret information is an encryption key in this particular example. The encryption key is used to access a database in this example. Client 126 performs an attestation with server 124 and receives an authorization signature from server 124 if the attestation is successful. The authorization signature is presented to trusted platform module 128 to obtain access to the encryption key. Attestation is the presentation of verifiable evidence about a platform. In this example, the verifiable evidence is the software state for client. Attestation 244 is the presentation of verifiable evidence about a platform. In this example, the verifiable evidence is software state for client computer 114.

Figure 2:
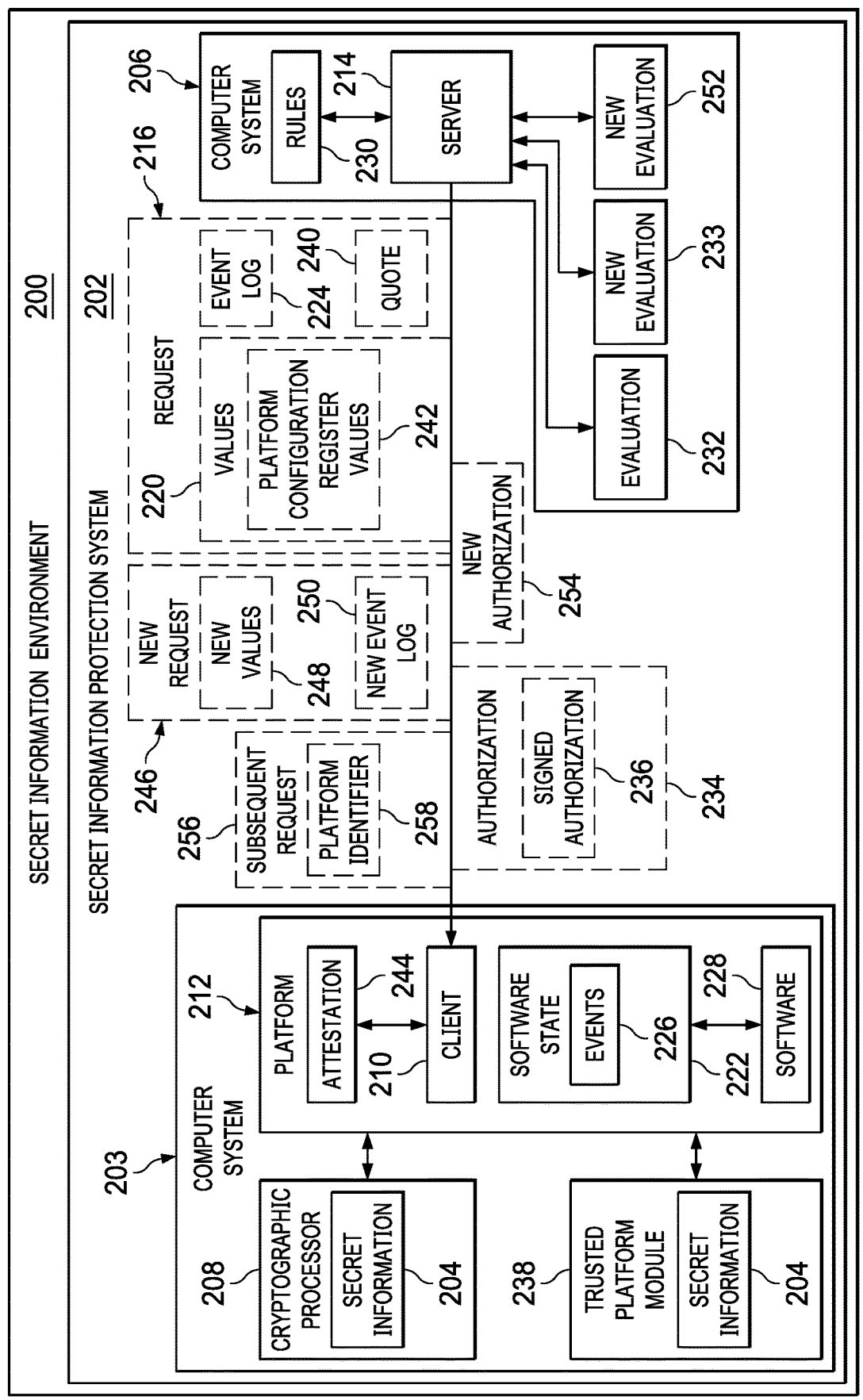
FIG. 2 is a block diagram of a secret information environment in accordance with an illustrative embodiment.

With reference now to FIG. 2, a block diagram of a secret information environment is depicted in accordance with an illustrative embodiment. In this illustrative example, secret information environment 200 includes components that can be implemented in hardware such as the hardware shown in network data processing system 100 in FIG. 1. As depicted. server 214 runs on computer system 206 and client 210 runs on computer system 203.

In this illustrative example, secret information system 202 operates to release secret information 204 in for client 210 on computer system 203. Secret information 204 can be selected from at least one of a key, a symmetric encryption key, decryption key, a signing key, transport layer security key, a password, or other suitable secret information.

Computer system 203 and 206 are physical hardware systems and each includes one or more data processing systems. When more than one data processing system is present in a computer system, those data processing systems are in communication with each other using a communications medium. The communications medium may be a network. The data processing systems may be selected from at least one of a computer, a server computer, a tablet, or some other suitable data processing system.

As depicted, secret information 204 is stored in a co-processor, such as cryptographic processor 208, in computer system 203. Cryptographic processor 208 is a hardware device and is designed to perform cryptographic operations. Cryptographic processor 208 can be located on a chip. In this illustrative example, cryptographic processor 208 can be, for example, without limitation, trusted platform module (TPM) 238 that implements ISO/IEC 11889.2009, prepared by the Trusted Computing Group (TCG). In this implementation, secret information 204 is stored on trusted platform module 238.

In one illustrative example, client 210 is located in platform 212 running on computer system 203 and desires access to secret information 204 stored in cryptographic processor 208. Platform 212 can be selected from a group comprising a data processing system, a virtual machine, a container, or some other construct in which client 210 can be located. As depicted, client 210 can be an application, program, or other software running on platform 212 in computer system 203.

When access to secret information 204 is desired, client 210 requests access from server 214. In this illustrative example, server 214 is located in computer system 206. In this example, client 210 and server 214 are located in separate physical computer systems.

As depicted, server 214 receives request 216 from client 210 for access to secret information 204 stored in cryptographic processor 208. In this illustrative example, request 216 includes a number of values 220 identifying software state 222 on platform 212, and further includes event log 224. The number of values 220 is digitally signed with a signing key to form a signature.

As depicted, event log 224 identifies events 226 relating to the running of software state 222 on platform 212. Events 226 also identify the order in which software 228 is run on platform 212. In this illustrative example, software 228 on platform 212 forms software state 222. Further, software state 222 may also include the order in which software 228 is run on platform 212.

After validating the signature, server 214 evaluates the number of values 220 and event log 224 using a set of rules 230 to form evaluation 232. The set of rules 230 indicates when software state 222 warrants access to the secret information 204 in cryptographic processor 208.

For example, the set of rules 230 may identify a list of software that is required for accessing secret information 204. The list of software may indicate that a particular basic input output system (BIOS) and operating system are needed to access secret information 204. In another example, the set of rules 230 may identify a database system that is required to the running on a platform 212 to access secret information 204. In still another illustrative example, the set of rules 230 may identify a list of forbidden software. The presence of forbidden software results in denying access to secret information 204. The list can also include specific versions of software that are permitted or forbidden.

In this illustrative example, server 214 sends authorization 234 to client 210 in response to evaluation 232 indicating that platform 212 is authorized to receive secret information 204 from cryptographic processor 208 for platform 212. As depicted, the authorization is signed, wherein the signed authorization enables accessing secret information 204 in cryptographic processor 208 by client 210.

In the illustrative example, request 216 can be made during at least one of prior to operating system initialization or after initialization of an operating system in platform 212. This manner of authorizing access to secret information 204 may be particularly useful after the initialization of the operating system. After initialization of the operating system, multithreaded processing may occur in running software 228. As result, the number of values 220 can change at each boot or start of platform 212.

Server 214 can receive new request 246 from client 210 made in response to a change in software state 222 in platform 212. As depicted, new request 246 includes a number of new values 248 identifying software state 222 and new event log 250. In this illustrative example, the number of new values 248 is digitally signed.

New event log 250 can comprise new events occurring since events in the event log 224. The events in the event log 224 are still valid if confirmed as trusted previously by server 214. All of the events can be sent in new event log 250. However, the sending of these previous events is unnecessary.

As depicted, server 214 evaluates the number of new values 248 identifying software state 222 in platform 212 and new event log 250 using the set of rules 230 to form new evaluation 252. Server 214 sends new authorization 254 to client 210 in response to new evaluation 252 indicating that client 210 is authorized to receive the secret information in the cryptographic processor for the platform. Client 210 then sends new authorization 254, which is signed, to cryptographic processor 208.

In another illustrative example, client 210 has already received authorization 234 and software state 222 is not changed since receiving authorization 234. In this case, when client 210 desires to access secret information 204 in cryptographic processor 208, client 210 send subsequent request 256 to server 214. As depicted, subsequent request 256 contains platform identifier 258. This subsequent request does not need to include event logs or the number of values 220. In another implementation, when software state 222 has not changed, client 210 can use the prior authorization without contacting server 214. For example, client 210 can use signed authorization 236 at a later time if software state 222 has not changed.

In response to receiving subsequent request 256, server 214 evaluates the number of values 220 identifying software state 222 and event log 224 from a prior request, such as request 216, using the set of rules 230 to form evaluation 232. Server 214 generates new authorization 254 in response to new evaluation 233 indicating that client 210 is authorized to receive secret information 204. New authorization 254 includes the values that are being approved. Server 214 on computer system 206 sends new authorization 254 to client 210 on computer system 203.

Server 214 and client 210 may be implemented in software, hardware, firmware or a combination thereof. When software is used, the operations performed by server 214 and client 210 may be implemented in program code configured to run on hardware, such as a processor unit. When firmware is used, the operations performed by server 214 and client 210 may be implemented in program code and data and stored in persistent memory to run on a processor unit. When hardware is employed, the hardware may include circuits that operate to perform the operations in server 214 and client 210.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In one illustrative example, cryptographic processor 208 can be implemented using trusted platform module 238. In this type of implementation, request 216 can be made using quote 240. The number of values 220 take the form of platform configuration register (PCR) values 242, which are signed by trusted platform module 238 using an attestation identity key (AIK). In this depicted example, the client 210 sends quote 240 to perform attestation 244 to offer cryptographic proof of software state 222 to server 214. In this illustrative example, attestation 244 is the presentation of verifiable evidence about platform 212 to server 214. The verifiable evidence is software state 222 for platform 212.

In response, server 214 compares event log 224 with their hashes in the form of platform configuration registers that are signed. If software state 222 is trusted, server 214 then determines whether to authorize access to secret information 204 using rules 230 to evaluates the number of values 220 and event log 224. Secret information 204 is sealed in trusted platform module 238 meaning that secret information 204 is encrypted.

Server 214 returns signed authorization 236 to client 210 when access to secret information 204 is permitted. Signed authorization 236 is presented to trusted platform module 238 by client 210. In response, trusted platform module 238 unseals secret information 204 and sends secret information 204 to client 210. Unsealing secret information 204 comprises decrypting secret information 204.

In one illustrative example, one or more technical solutions are presented that overcome a technical problem with releasing secret information accessed using an authorization signature in post operating system conditions. As a result, one or more technical solutions may provide a technical effect enabling releasing secret information in the cryptographic processor. One or more technical solutions may provide an advantage over current mechanisms for determining whether trusted software states reported are accurate when releasing secret information after initialization of an operating system.

As a result, computer system 206 and computer system 203 operates as special purpose computer systems in which these computer systems enable releasing secret information. In particular, at least one of client 210 or server 214, when running a process to access secret information 204 as described with respect to FIG. 1 and FIG. 2, transforms these computer systems into special purpose computer systems as compared to currently available general computer systems that do not have at least one of client 210 or server 214.

Thus, the illustrative embodiments provide a method, apparatus, computer system, and computer program product for releasing secret information. The different illustrative examples can be used at any time during the operation of a platform. The illustrative examples, may provide additional advantages to current mechanisms after software is initialized in a post operating system environment in which the operating system is already running.

For example, rather than the server pre-calculating the authorization for all platforms and distributing these authorizations, server 214 signs authorizations at run time. In the illustrative examples, each platform receives a distinct authorization based on the reporting of the software state on that platform. When server 214 decides that the platform is trusted after analyzing a trusted event log, server 214 returns a signed authorization that can be used by that platform to unseal a secret in the cryptographic processor for that platform. Thus, client 210 and server 214 interact whenever an access to secret information is needed. Moreover, when client 210 detects a change in values 220 for software state 222, client 210 can request a new authorization signature.

With the new request, the entire event log does not need to be sent to server 214. Instead, client 210 sends an incremental event log to server 215 that contains events for software that has occurred since last authorization. Server 214 evaluates only the new events rather than all of the events in event log 224. For example, after validating the current values in cryptographic processor 208, server 214 can validate the incremental event log against the change in the values since the last request. Based on the assessment of the incremental event log, server 214 sends a new authorization to client 210 that can be used to access secret information 204 in cryptographic processor 208.

The illustration of secret information environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, quote 240 may include other information in addition to platform configuration register values 242. Quote 240 may also include a nonce, which is a value used once in cryptographic operations in this illustrative example. The nonce is supplied by server 214 to client 210 and used in quote 240 to ensure that the quote 240 received from client 210 reflects the current values for platform configuration register values 242.

Further, the evaluation performed by server 214 can be customized for different platforms. For example, different software states can be required for different platforms. Further, client 210 can identify an application requesting the release of secret information 204. The evaluation performed by server 214 is part of attestation 244 and can be customized for that particular application requesting the release of secret information 204.

Figure 3:
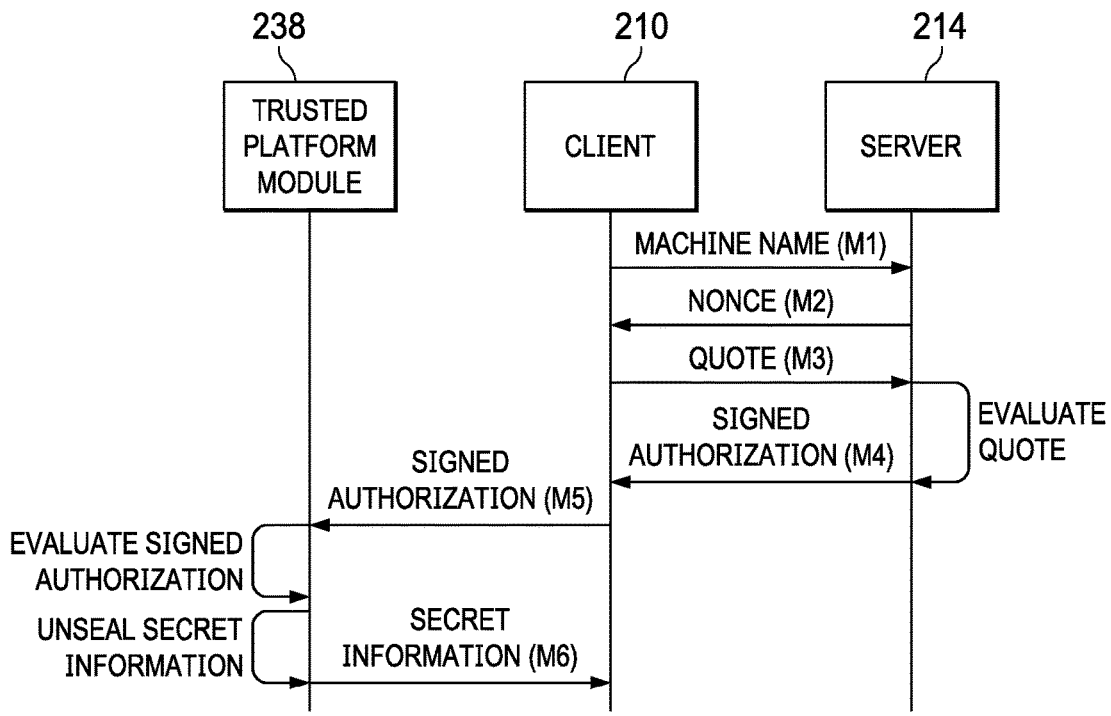
FIG. 3 is a message flow diagram for requesting access to secret information stored in the cryptographic processor in accordance with an illustrative embodiment.

With reference next to FIG. 3, a message flow diagram for requesting access to secret information stored in the cryptographic processor is depicted in accordance with an illustrative embodiment. In the illustrative examples, the same reference numeral may be used in more than one figure. This reuse of a reference numeral in different figures represents the same element in the different figures. In this figure, message flow is shown between client 210, server 214, and trusted platform module 238. This message flow is described with respect to steps that may be taken using trusted platform module 238 that contains platform configuration registers that store platform configuration register values 242 that indicate the software state of a platform. This message flow occurs to unseal secret information for a particular software state in a platform and in which the software state has not changed since the authorization.

As depicted, client 210 sends the machine name of the platform to server 214 (message M1). In response, server 214 returns a nonce to client 210 (message M2).

Client 210 sends a quote to server 214 (message M3). In message M3, the quote contains the nonce and a number of platform configuration register values that are signed by trusted platform module 238. As depicted in this example, the quote is the signature over the nonce and the platform configuration register values. The event log is unsigned and sent together with the quote or in a separate message or transmission from the quote sent to server 214.

Server 214 evaluates the quote to determine whether the software state reported by client 210 for platform 212 is to be trusted. If the platform configuration register values came from an authentic trusted platform module (TPM), server 214 uses the platform configuration register values to determine whether the event log from the client accurately reflects the client 210 software state. Server 214 finally uses the event log to determine whether the software state for the platform is to be trusted as being accurate.

If the software state is trusted, server 214 determines whether access to the secret information in trusted platform module 238 should be unsealed for client 210 based on a set of rules. In this example, the set of rules can identify what software is required on the platform, what software be on platform, or some combination thereof.

If server 214 determines that secret information should be unsealed, server 214 returns a signed authorization to client 210 (message M4). In message M4, the signed authorization is generated by calculating a platform configuration register digest, calculating an approved policy digest, and signing this digest with an approved private key. A digest is an output from a cryptographic hash function.

In this illustrative example, server 214 constructs a policy for the authorization. The policy contains commands the client 210 uses with trusted platform module 238 to unseal the secret information. For example, a policy can be calculated using TPM2_PolicyCommandCode( ) with a command of TPM_CC_Unseal as terms in the policy. These functions forming the terms are from the Trusted Platform Module 2.0 Specification. These terms indicate that the authorization is for an unseal operation.

Server 214 calculates a platform configuration register digest that is computationally identical to the value that will be calculated by trusted platform module 238 using the number of platform configuration register values that have been validated previously. For example, server 214 calculates the platform configuration register digest that is computationally identical to the value that will be calculated by trusted platform module 238 running TPM2_PolicyPCR( ) using the number of platform configuration module values that have been validated previously. Client 210 will run the same TPM2_PolicyCommandCode( ) and TPM2_ PolicyPCR( ) to derive the same approved policy.

In response to receiving the signed authorization, client 210 sends the signed authorization to trusted platform module 238 (message M5). As depicted, trusted platform module 238 evaluates the signed authorization.

For example, client 210 calculates a digest AHASH of the approved policy. Client 210 loads the authorizing public key in its TPM using TPM2_LoadExternal( ) Next, client 210 runs TPM2_VerifySignature( ) specifying the authorizing public key, AHASH, and the authorizing signature.

Trusted platform module 238 returns a ticket indicating that the signature has been verified. The ticket can be used as an optimization to avoid the time consuming public key signature verification in cases where the values in the platform configuration registers do not change. If the values of platform configuration registers change, client 210 requests a new authorization from server 214. Client 210 starts a policy session. In this example, client 210 will run the same policy commands TPM2_PolicyCommandCode( ) and TPM2_PolicyPCR( ) that server 214 used to calculate the authorizing policy. In other words, server 214 does not use a trusted platform module. Instead, server 214 runs in software the commands that client 210 will run using the trusted platform module in client 210.

If the platform configuration register values have not been changed, the calculation results in the same value. If the result is different because the platform configuration register values have changed, this situation indicates that new, potentially untrusted software has run on client 210. In this case, client 210 must rerun the quote and obtain a new authorization using the data flow shown in FIG. 2.

The client runs TPM2_PolicyAuthorize( ), supplying the approved policy and the signature verification ticket. If the validation succeeds, the policy session digest is updated to the unseal policy. In this example, this policy session digest matches the unseal policy. In more complex use cases, more policy commands may be run.

Client 210 loads the sealed secret information onto trusted platform module 238 using TPM2_Load( ) Client 210 runs TPM2_Unseal( ) to cause trusted platform module 238 to unseal the secret information.

In this example, trusted platform module 238 sends the secret information to client 210 (message M6).

Figure 4:
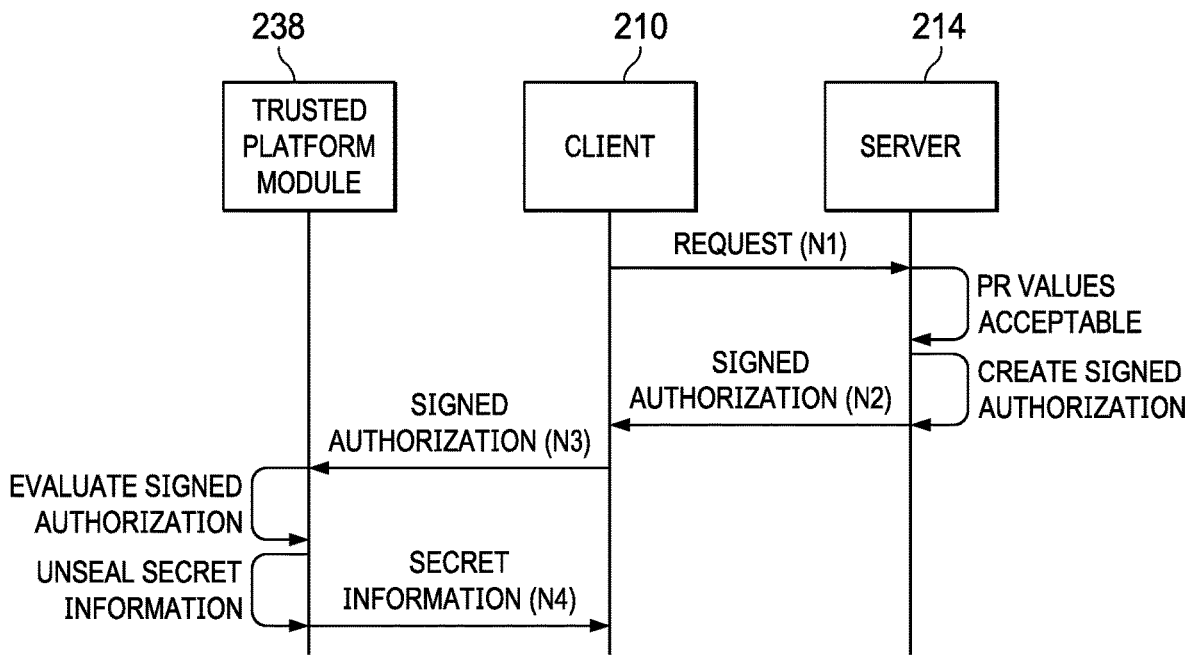
FIG. 4 is a message flow diagram for requesting access to secret information stored in the cryptographic processor after a prior approval in accordance with an illustrative embodiment.

Turning next to FIG. 4, a message flow diagram for requesting access to secret information stored in the cryptographic processor after a prior approval is depicted in accordance with an illustrative embodiment. In FIG. 4, message flow is shown between client 210, server 214, and trusted platform module (TPM) 238. This message flow can be used if the software state did not change. This figure shows an example in which the authorization is for a one-time use. In other cases, the authorization can be used again if the platform configuration values do not change.

As depicted, client 210 sends a request for authorization to unseal the secret information stored in trusted platform module 238 (message N1). In message N1, the request contains platform identifier such as a machine name for the platform in which client 210 is located.

In response to receiving the request, server 214 determines whether the prior platform configuration register values are acceptable in determining whether to authorize the unsealing of the secret information. If the secret information can be unsealed, the process creates a signed authorization. Server 214 sends signed authorization to client 210 (message N2).

Client 210 sends the signed authorization to trusted platform module 238 for processing (message N3). In this illustrative example, trusted platform module 238 evaluates the signed authorization in determining whether to unseal the secret information. If the authorization is valid, trusted platform module 238 unseals the secret information. Trusted platform module 238 then sends the secret information to client 210 (message N4).

As depicted in the examples in FIGS. 2-4, client 210 and server 214 interact each time access to the secret information held by a trusted platform module is needed. These examples are an alternate implementation. The request for access must be performed if the software state changes, if the server requires an authorization for each unseal, or if the client requests an authorization for each unseal. This type of interaction results in a technical effect of increasing security in accessing secret information held in trusted platform modules for different forms.

The data flow diagrams illustrated in FIG. 3 and FIG. 4 have been presented as one manner in which messages may be sent to access secret information stored in a trusted platform module. This illustration is not meant to limit the manner in which data flow may occur in other implementations. For example, the data flow in FIG. 4 is an optional data flow that can be implemented as a performance improvement. The message flow in FIG. 3 in which a quote is sent to the server 214, can be used every time in other implementations.

In still other illustrative examples, a performance improvement can be made when software state changes on a platform. For example, rather than sending the entire event log, the client can send an incremental portion of the event log containing events occurred since the last successful authorization. The incremental event log is the new event log sent to server 214 in the illustrative example in FIG. 2. In this manner, only new measurements of events regarding software are sent to server 214. In this example, server 214 only evaluates the new events rather than the entire event log after validating the current platform configuration register values 242. The change in the platform configuration register values 242 can be evaluated against the events in the new event log. In this manner, savings in processor resources, transmission resources, and other resources may occur.

Turning next to FIG. 5, a flowchart of a process for processing a request for secret information in a cryptographic processor is depicted in accordance with an illustrative embodiment. The processes in FIG. 5 can be implemented in hardware, software, or both. When implemented in software, the processes can take the form of program code that is run by one or more processor units located in one or more hardware devices in one or more computer systems. For example, these processes can be implemented in server 214 running on computer system 206 in FIG. 2.

The process begins by receiving a request from a client for access to secret information stored in a cryptographic processor (step 500). This request is received prior to, during, or after the initialization of the operating system. In step 500, the request includes a number of values identifying a software state on the platform and an event log. The number of values is digitally signed.

The process evaluates the number of values identifying the software state and the event log using a set of rules to form an evaluation (step 502). The set of rules in step 502 indicates when the software state warrants access to the secret information in the cryptographic processor.

The process sends an authorization to the client in response to the evaluation indicating that the client is authorized to receive the secret information from the cryptographic processor for the platform (step 504). The process terminates thereafter. The authorization enables accessing the secret information in the cryptographic processor by the client.

Turning next to FIG. 6, a flowchart of a process for processing a new request for accessing secret information in the cryptographic processor is depicted in accordance with an illustrative embodiment. The processes in FIG. 6 can be implemented in hardware, software, or both. When implemented in software, the processes can take the form of program code that is run by one or more processor units located in one or more hardware devices in one or more computer systems. For example, these processes can be implemented in server 214 running on computer system 206 to process a request to access secret information from client 210 running on computer system 203 in FIG. 2.

The process begins by receiving a new request from a client made in response to a change in a software state in a platform (step 600). The new request includes a number of new values identifying the software state and a new event log, wherein the number of new values is digitally signed. The digital signing is performed by the cryptographic processor for the platform in this illustrative example.

The process evaluates the number of new values identifying the software state in the platform and the new event log using a set of rules to form a new evaluation (step 602). The set of rules indicates when the software state warrants access the secret information in the cryptographic processor.

The process sends a new authorization to the client in response to the new evaluation indicating that the client is authorized to receive secret information in the cryptographic processor for the platform (step 604). The process terminates thereafter.

In FIG. 7, a flowchart of a process for processing a subsequent request for accessing secret information in the cryptographic processor when the software state has not changed is depicted in accordance with an illustrative embodiment. The processes in FIG. 7 can be implemented in hardware, software, or both. When implemented in software, the processes can take the form of program code that is run by one or more processor units located in one or more hardware devices in one or more computer systems. For example, these processes can be implemented in server 214 running on computer system 206 in FIG. 2.

The process begins by the server on a computer system receiving a platform identifier in a subsequent request from a client on another computer system (step 700). The platform identifier can be, for example, a machine name, media access control (MAC) address, or some other suitable identifier, The process evaluates a number of values identifying a software state and an event log from a prior request using a set of rules to form an evaluation (step 702). The process sends an authorization to the client in response to the evaluation indicating that the client is authorized to receive the secret information (step 704). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 8:
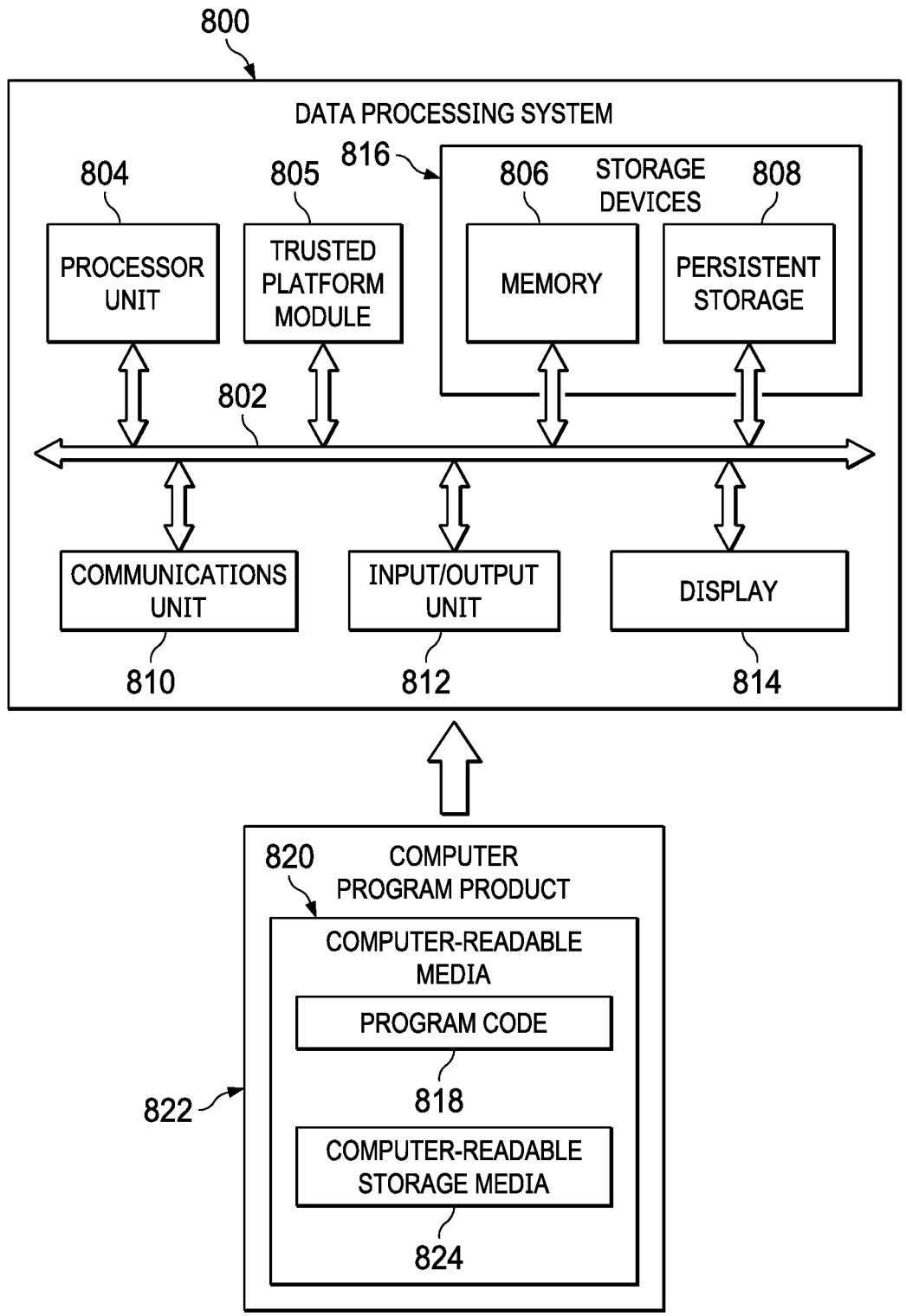
FIG. 8 is a block diagram of a data processing system in accordance with an illustrative embodiment.

Turning now to FIG. 8, an illustration of a block diagram of a data processing system is depicted in accordance with an illustrative embodiment. Data processing system 800 may be used to implement server computer 104 in FIG. 1, client devices 110 in FIG. 1, computer system 203 in FIG. 2, and computer system 206 in FIG. 2. In this illustrative example, data processing system 800 includes communications framework 802, which provides communications between processor unit 804, trusted platform module (TPM) 805, memory 806, persistent storage 808, communications unit 810, input/output (I/O) unit 812, and display 814. In this example, communications framework 802 may take the form of a bus system.

Processor unit 804 serves to execute instructions for software that may be loaded into memory 806. Processor unit 804 may be a number of processors, a multi-processor core, or some other type of processor, depending on the particular implementation. Trusted platform module 805 is a cryptographic processor that stores secret information. Trusted platform module 805 can also store measurements about data processing system 800 in platform configuration registers.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 806, in these examples, may be, for example, a random-access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a solid-state drive (SSD), a flash memory, a rewritable optical disk, a rewritable magnetic tape, or some combination of the above. The media used by persistent storage 808 also may be removable. For example, a removable hard drive may be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer usable program code, or computer-readable program code that may be read and run by a processor in processor unit 804. The program code in the different embodiments may be embodied on different physical or computer-readable storage media, such as memory 806 or persistent storage 808.

Program code 818 is located in a functional form on computer-readable media 820 that is selectively removable and may be loaded onto or transferred to data processing system 800 for processing by processor unit 804. Program code 818 and computer-readable media 820 form computer program product 822 in these illustrative examples. In the illustrative example, computer-readable media 820 is computer-readable storage media 824.

In these illustrative examples, computer-readable storage media 824 is a physical or tangible storage device used to store program code 818 rather than a medium that propagates or transmits program code 818.

Alternatively, program code 818 may be transferred to data processing system 800 using a computer-readable signal media. The computer-readable signal media may be, for example, a propagated data signal containing program code 818. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code 818.

Thus, illustrative embodiments of the present invention provide a computer implemented method, computer system, and computer program product for releasing secret information stored in cryptographic processor. A computer system receives a request from a client for access to the secret information stored in the cryptographic processor after initialization of an operating system in a platform. The request includes a number of values identifying a software state on the platform and an event log, wherein the number of values is digitally signed. The computer system evaluates the number of values identifying the software state and the event log using a set of rules to form an evaluation. The set of rules indicates when the software state warrants access to the secret information in the cryptographic processor. The computer system sends an authorization to the client in response to the evaluation indicating that the platform is authorized to receive the secret information from the cryptographic processor for the platform. The authorization enables accessing the secret information in the cryptographic processor by the client.

As a result, a client receives a signed authorization that can be sent to a cryptographic processor to access the secret information stored in an encrypted form in the cryptographic processor.

The different illustrative examples provide a technical solution for problems caused by software starting after an operating system has been initialized in a multithreaded mode that causes the order change at each boot. Further, the different illustrative examples enable providing authorization even with updates happening more commonly with post operation system software then with pre-operating system software. Further, the illustrative examples take into account that values stored in the cryptographic processor may be continually updated as software runs on a platform.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for releasing secret information, the method comprising:
   performing, by a client on a computer system, an attestation to a server on another computer system;
   receiving, by the client on the computer system, an authorization that authorizes releasing the secret information; and
   releasing, by the client on the computer system, the secret information from a co-processor on the computer system using the authorization received from the server.

2. The method of claim 1 further comprising:
   detecting, by the client on the computer system, a change in a software state of the client; and
   identifying, by the client on the computer system responsive to detecting the change in the software state, the authorization received from the server as being invalid.

3. The method of claim 2, wherein the attestation is a prior attestation and further comprising:
   performing, by the client on the computer system, a subsequent attestation in which an incremental event log is sent to the server, wherein the incremental event log includes an incremental portion of an event log used in the prior attestation containing events occurred since a last successful authorization.

4. The method of claim 1, wherein the secret information is selected from at least one of a key, a symmetric encryption key, a decryption key, a signing key, a transport layer security key, or a password.

5. The method of claim 1, wherein an evaluation performed by the server during attestation can be customized for different platforms.

6. The method of claim 1 further comprising:
    identifying, by the client on the computer system, an application requesting release of the secret information; and
    performing the attestation with the server using an identification of the application, wherein an evaluation performed by the server during attestation is customized for the application.

7. A method for releasing secret information in a co-processor, the method comprising:
    receiving, by a computer system, a request from a client for access to the secret information stored in the co-processor, wherein the request includes a number of values identifying a software state in a platform, wherein the number of values is digitally signed;
    evaluating, by the computer system, the number of values identifying the software state using a set of rules to form an evaluation, wherein the set of rules indicates when the software state warrants access to the secret information in the co-processor; and
    sending, by the computer system, an authorization to the client in response to the evaluation indicating that the platform is authorized to receive the secret information from the co-processor for the platform, wherein the authorization enables accessing the secret information in the co-processor by the client.

8. The method of claim 7, wherein the request includes an event log and wherein the evaluation takes into account the number of values identifying the software state and the event log and further comprising:
    receiving, by the computer system, a new request from the client made in response to a change in the software state in the platform, wherein the new request includes a number of new values identifying the software state and a new event log, wherein the number of new values is digitally signed;
    evaluating, by the computer system, the number of new values identifying the software state in the platform and the new event log using the set of rules to form a new evaluation, wherein the set of rules indicates when the software state warrants access to the secret information in the co-processor; and
    sending, by the computer system, a new authorization to the client in response to the new evaluation indicating that the client is authorized to receive the secret information in the co-processor for the platform.

9. The method of claim 8, wherein the event log is a previous event log that was previously evaluated and wherein the new event log comprises new events occurring since events in the previous event log.

10. The method of claim 7 further comprising:
    receiving, by the computer system, a subsequent request from the client, wherein the subsequent request contains a platform identifier;
    evaluating, by the computer system, the number of values identifying the software state and an event log from a prior request using the set of rules to form the evaluation; and
    sending, by the computer system, the authorization to the client in response to the evaluation indicating that the platform is authorized to receive the secret information.

11. The method of claim 7, wherein a server in the computer system sends the authorization to the client and further comprising:
    receiving, by the client, the authorization from the server;
    sending, by the client, the authorization to the co-processor; and
    receiving, by the client, the secret information from the co-processor in response to the authorization.

12. The method of claim 7, wherein the number of values is a number of platform configuration register values from the co-processor, the co-processor is a trusted platform module, and the number of platform configuration register values correspond to a sequence of events in which software is run in the platform.

13. The method of claim 7, wherein the platform is selected from a group comprising: a data processing system, a virtual machine, and a container.

14. The method of claim 7, wherein the secret information is selected from at least one of a key, a symmetric encryption key, a decryption key, a signing key, a transport layer security key, or a password.

15. A secret information release system comprising:
    a computer system;
    a server running on the computer system, wherein the server receives a request from a client running on another computer system for access to secret information stored in a co-processor, wherein the request includes a number of values identifying a software state on a platform, wherein the number of values is digitally signed; evaluates the number of values identifying the software state using a set of rules to form an evaluation, wherein the set of rules indicates when the software state warrants access to the secret information in the co-processor; and sends an authorization to the client in response to the evaluation indicating that the platform is authorized to receive the secret information from the co-processor for the platform, wherein the authorization enables accessing the secret information in the co-processor by the client.

16. The secret information release system of claim 15, wherein the request includes an event log and wherein the evaluation takes into account the number of values identifying and the event log and wherein the server receives a new request from the client made in response to a change in the software state in the platform, wherein the new request includes a number of new values identifying the software state and a new event log, wherein the number of new values is digitally signed; evaluates the number of new values identifying the software state in the platform and the new event log using the set of rules to form a new evaluation, wherein the set of rules indicates when the software state warrants access to the secret information in the co-processor; and sends a new authorization to the client in response to the new evaluation indicating that the client is authorized to receive the secret information in the co-processor for the platform.

17. The secret information release system of claim 16, wherein the event log is a previous event log that was previously evaluated and wherein the new event log comprises new events occurring since events in the previous event log.

18. The secret information release system of claim 15, wherein the server receives a subsequent request from the client, wherein the subsequent request contains a platform identifier; evaluates the number of values identifying the software state and an event log from a prior request using the set of rules to form the evaluation; and sends the authorization to the client in response to the evaluation indicating that the platform is authorized to receive the secret information.

19. The secret information release system of claim 15 further comprising:
a client running on the platform in the computer system, wherein the client receives the authorization from the server; and sends the authorization to the co-processor for platform; receives the secret information from the co-processor in response to the authorization.

20. The secret information release system of claim 15, wherein the number of values is a number of platform configuration register values from the co-processor, the co-processor is a trusted platform module, the number of platform configuration register values correspond to a sequence of events in which software is run in the platform.

21. A computer program product for releasing secret information in a co-processor, the computer program product comprising:
a computer-readable storage media;
first program code, stored on the computer-readable storage media, for performing, by a client on a computer system, an attestation to a server on another computer system;
second program code, stored on the computer-readable storage media, for receiving, by the client on the computer system, an authorization that authorizes releasing the secret information; and
third program code, stored on the computer-readable storage media, for releasing, by the client on the computer system, the secret information from a co-processor on the computer system using the authorization received from the server.

22. The computer program product of claim 21 further comprising:
fourth program code, stored on the computer-readable storage media, for detecting, by the client on the computer system, a change in a software state of the computer; and
fifth program code, stored on the computer-readable storage media, for identifying, by the client on the computer system responsive to detecting the change in the software state, the authorization received from the server as being invalid.

23. The computer program product of claim 22, wherein the attestation is a prior attestation and further comprising:
sixth program code, stored on the computer-readable storage media, for performing, by the client on the computer system, a subsequent attestation in an incremental event log is sent to the server, wherein the incremental event log includes an incremental portion of an event log used in the prior attestation containing events occurred since the last successful authorization.

* * * * *